Jan. 25, 1955  R. L. GODSHALK ET AL  2,700,375
FLUID COOLED FURNACE WALL
Filed Dec. 3, 1946  4 Sheets-Sheet 3
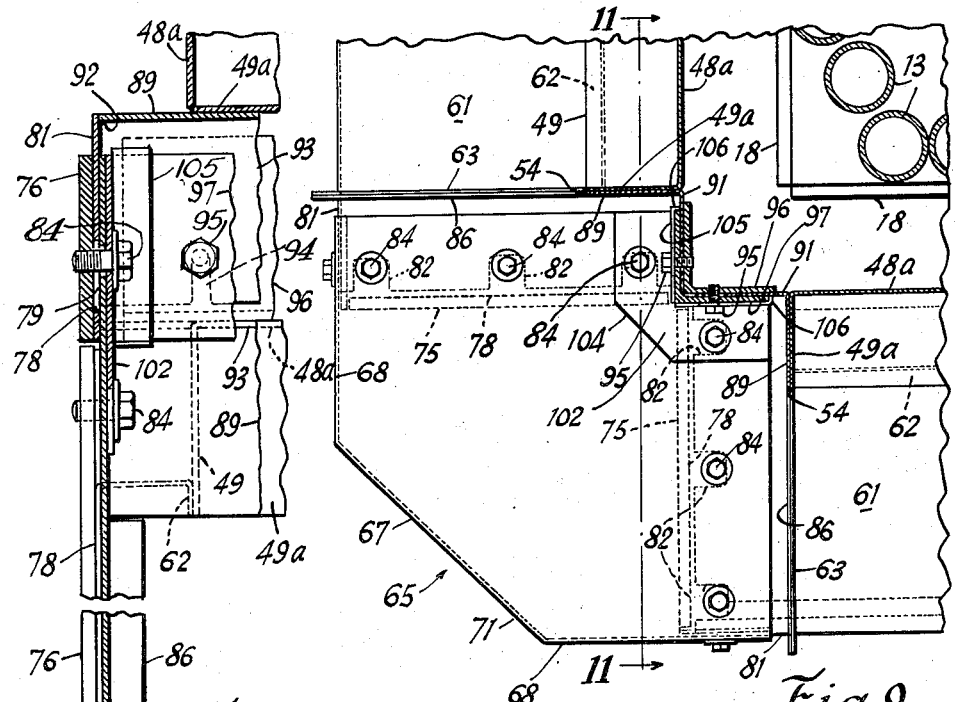
Fig. 11  Fig. 9
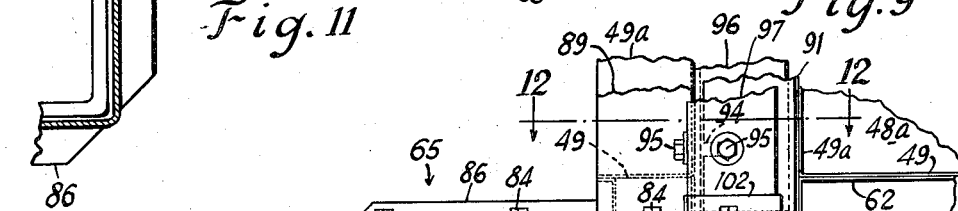
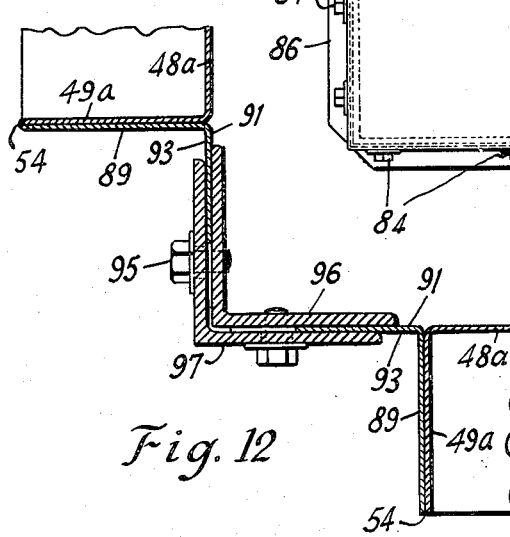
Fig. 12  Fig. 10
INVENTORS
RUSSELL L. GODSHALK &
GLEN J. SCHOESSOW
BY
ATTORNEY

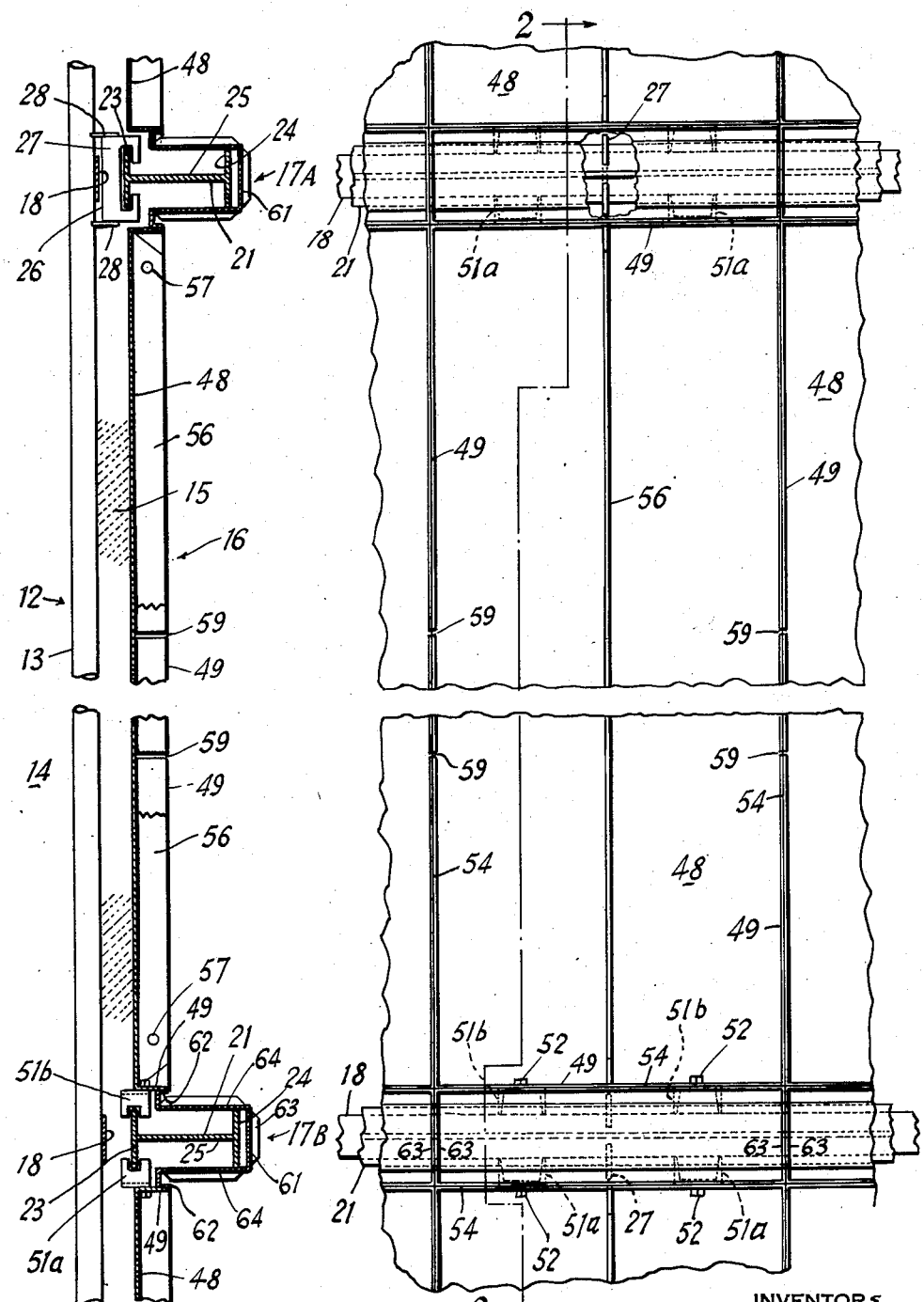

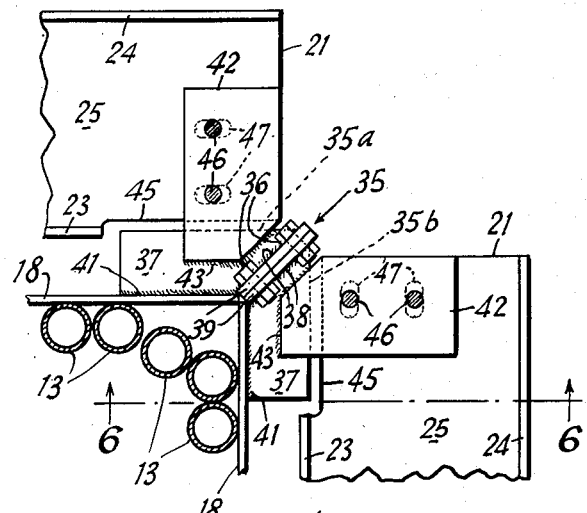
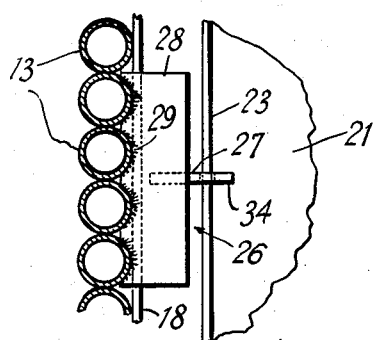
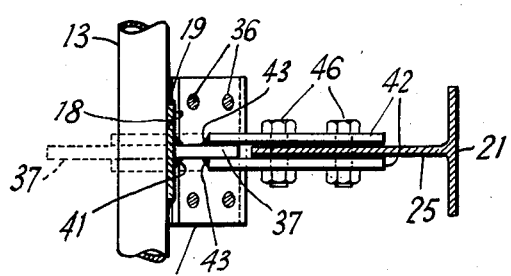
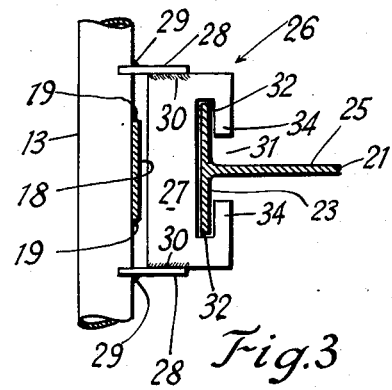
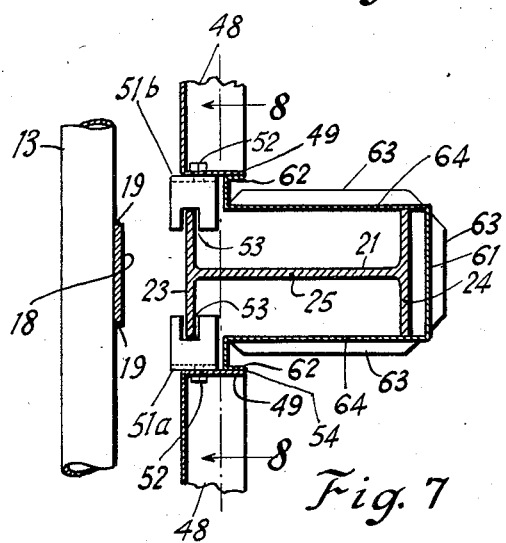
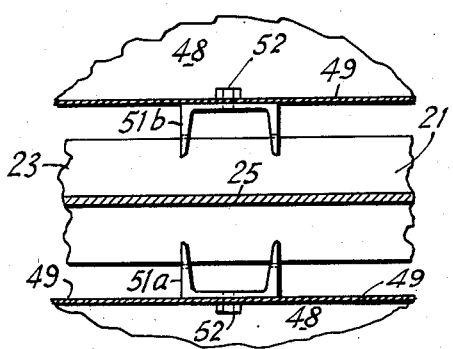

INVENTORS
RUSSELL L. GODSHALK &
GLEN J. SCHOESSOW
BY
ATTORNEY

United States Patent Office 2,700,375
Patented Jan. 25, 1955

2,700,375

FLUID COOLED FURNACE WALL

Russell L. Godshalk, Akron, and Glen J. Schoessow, Barberton, Ohio, assignors to The Babcock & Wilcox Company, Rockleigh, N. J., a corporation of New Jersey Application December 3, 1946, Serial No. 713,764

6 Claims. (Cl. 122—6)

The invention herein disclosed relates to the construction of a fluid cooled wall suitable for use as an enclosure for a chamber or passage containing hot gases at various pressures above or below atmospheric. More particularly, the invention is adapted for use in the construction of a gas tight enclosing wall structure for a fuel fired combustion chamber associated with heat exchange apparatus of various types including, for example, vapor generating units in which a considerable proportion of the total heat transfer surface is embodied in one or more combustion chamber walls.

An object of our invention is in connection with a chamber wall structure having heat transfer surface associated therewith in the form of upwardly extending tubes wherein means are provided for adequately staying said structure against possible distortion resulting from varying fluid pressure conditions internally of the chamber.

Another object of the invention is in the provision of a fluid cooled wall structure having an outer wall casing portion associated with and supported by means providing lateral support for the wall.

An additional object is in the construction of a wall casing formed of removable sheet metal panels which are economical as regards their fabrication and installation.

A further object is to provide a paneled wall casing of gas tight construction having sufficient strength to withstand furnace draft or pressure without distortion and consequent disruption of seals between adjoining panels.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Of the drawings:

Fig. 1 is a fragmentary exterior elevational view of an encased fluid cooled wall constructed in accordance with our invention;

Fig. 2 is a vertical wall section taken along line 2—2 of Fig. 1;

Fig. 3 is a fragmentary enlargement of Fig. 2 showing buckstay support details;

Fig. 4 is a plan view of Fig. 3;

Fig. 5 is a fragmentary plan section showing tie-bar and buckstay connections at the juncture of two walls;

Fig. 6 is a vertical section taken along line 6—6 of Fig. 5;

Fig. 7 is a fragmentary enlargement of Fig. 2 featuring casing support details;

Fig. 8 is a vertical section taken along line 8—8 of Fig. 7;

Fig. 9 is a fragmentary plan view showing the corner casing assembly for buckstays in adjoining walls;

Fig. 10 is an elevational view of Fig. 9;

Fig. 11 is an enlarged vertical section taken along line 11—11 of Fig. 10;

Fig. 12 is a fragmentary plan section, taken along line 12—12 of Fig. 10, showing the corner seal construction for casings in adjoining walls; and, Figs. 13 to 16 inclusive show various elements of the corner casing assembly illustrated in Figs. 9, 10 and 11.

Figure 15:
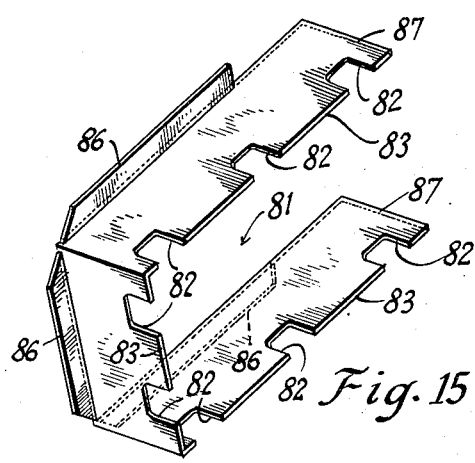

As illustrated, the invention is shown in connection with a fluid cooled wall 12 adapted for use in boiler construction, for example, as an outer wall for the combustion chamber, or for other heated chambers and hot gas conducting passages. For purposes of this application it may be assumed that the wall 12 is one of a plurality of upright walls defining a chamber generally rectangular in horizontal cross-section and that the wall 12 is vertically supported in known manner, at an elevation intermediate its total height, or from an end portion, above or below the portion illustrated in Figs. 1 and 2.

The wall 12 as shown includes a row of closely spaced upright fluid conducting tubes 13 arranged for example in tube-to-tube relation, as indicated in Fig. 4, for absorption of heat from the adjoining chamber or passage 14. Heat insulating material 15 is applied in one or more layers outwardly of the row of tubes 13, and a gas tight outer casing 16 provided of a form to be hereinafter more fully described.

Wall 12 and similar upright walls of chamber 14 are afforded lateral support by buckstay assemblies or units 17A and 17B arranged at different elevations along substantially straight length portions of the wall tubes 13, each such lateral support unit including a horizontally extending tie-bar member 18 by which the tubes 13 are bonded together throughout the row, each tie-bar 18 being rigidly secured to successive tubes 13 by connections in the form of welds 19 as is customary. The buckstay proper, that is, member 21, consists of a single horizontally disposed I-beam, or the equivalent, having inner and outer flanges 23 and 24 parallel to the tube row 13 and connected by a web 25 at right angles thereto.

Each buckstay 21 is supported on the row of tubes 13, in laterally spaced relation thereto, by means of brackets 26 arranged at intervals throughout the horizontal extent of the wall and forming connections between the buckstay and the tubes. Each bracket 26 includes an upright plate member 27 arranged to engage the buckstay 21, and horizontal top and bottom plates 28, 28 by which the bracket is rigidly secured by welds 29 to a group of tubes 13, for example, as shown in Figs. 3 and 4, each plate 28 being secured as by welds 30 to the associated upright plate 27. The outer edge of each plate 27 is formed with a T-shaped notch 31 therein to provide a pair of vertically opposed slots 32 adapted to receive the upper and lower edge portions of the inner buckstay flange 23, the outer wall of each slot 32 being formed by a hook-like plate portion 34 terminating short of the buckstay web 25 and adapted to overlap the outer face of buckstay flange 23. Each buckstay 21 is thereby arranged so that its lower depending flange portion 23a is vertically supported in the lower slots 32 of brackets 26, and at the same time by its engagement with upper and lower slots is maintained in predetermined horizontally spaced relation with respect to the tube row 13, the upper and lower slots 32 being suitably dimensioned so as to provide adequate clearances both horizontally and vetrically with respect to flange 23 to permit free longitudinal movement of buckstay 21 relative to the tube row 13 in response to temperature variations.

Buckstay units 17A and 17B in adjoining walls are connected at a corner of chamber 14 as illustrated in Figs. 5 and 6. The connection for each two adjoining units 17A or 17B includes a corner bracket 35 formed in two separate sections 35a and 35b which are connected to the tie-bars 18 and buckstays 21 of the respective walls, and the two sections 35a and 35b fastened together by bolts 36 or other suitable holding means. Each corner bracket section 35a or 35b comprises a horizontal web plate 37 having one end mitered and secured by welds 38 top and bottom to an upright flange plate 39, and its inner edge secured by welds 41 to a tie-bar 18. Plates 42 extend horizontally from web plate 37 and are secured to opposite faces thereof by welds 43, each web plate 37 being in coplanar alignment with the adjacent buckstay web 25 so that the plates 42 overlap web 25 at opposite sides where an end portion of the inner buckstay flange 23 is cut away as at 45 to permit such assembly. An expansible connection is provided between each buckstay 21 and the corresponding corner bracket plates 42 by bolts 46 which extend through slotted holes 47 in the buckstay web 25. The corresponding bolt holes in plates 42 which are circular and provide only normal clearances, maintain the bolts 46, or other suitable connectors, in substantial planar alignment with the tie-bar 18 in the adjoining wall, whereas the bolt holes 47 which are elongated parallel to the tie-bar of the associated wall permit horizontal differential movement between each buckstay and the corresponding wall to compensate for relative expansion and contraction.

The outer casing 16 is formed of a plurality of initially separate panels 48 (Figs. 1, 2) each of substantially rectangular formation and having an outwardly extending peripheral flange 49 adjoining similar flanges of adjoining elements of the casing. In the section of casing 16 which extends between upper and lower buckstay units such as 17A and 17B, the panels 48 are installed in a single horizontal row with each having clips 51a and 51b secured by cap bolts 52 to flange 49 along the upper and lower panel margins respectively, each clip 51a or 51b being of channel cross-section and having its flanges transversely slotted as at 53 (Fig. 7) to straddle the edge of the adjacent inner buckstay flange 23, the lower set of clips 51b seating on the flange of the lower buckstay 21 and serving to support the weight of each panel, and both sets of clips 51a and 51b, in engagement with buckstay flanges 23 at the respective ends, serving to maintain each panel in predetermined laterally spaced relation with respect to the tube row 13, preferably with the back face of each panel in a common vertical plane with the back faces of the inner buckstay flanges 23. As indicated in Fig. 1, the buckstay support brackets 26 are displaced horizontally along the wall from the positions of clips 51a and 51b to prevent interference therewith.

The clips 51a and 51b being slidable along the I-beam flange portions 23 also enable each panel to be shifted to the proper assembling position, and during operation provide the necessary restraining action to furnace draft acting on the casing, while allowing for longitudinal differential movement of buckstay member 21, all joints between casing sections and panels being seal welded as at 54 to provide a gas tight casing assembly as further described hereinafter. A stiffener bar 56 is welded to each panel intermediate the width thereof and in conjunction with the panel flange 49 provides sufficient panel stiffness to resist furnace draft acting over the total panel area. A hole 57 in bar 56 adjacent each end enables the panel to be conveniently lifted into position during erection. For long length panels, for example, panels over five feet in length, each longitudinal flange 49 is cut transversely to provide one or more gaps or slots 59 to permit adjoining flanges 49 to be connected by welds 54 without causing distortion of the flanges and panels, the slots 59 in each two adjoining flanges being correspondingly positioned and being subsequently closed by welding to render the joints gas tight.

In a casing as shown Figs. 1 and 2, having paneled casing sections above and below a given buckstay unit 17A or 17B, the continuity of the gas tight casing construction is maintained by a flexible casing section 61 providing an expansible connection between the upper and lower panels 48. Each connecting section 61, otherwise known as a breather plate or housing, is transversely continuous between upper and lower flanges 62 which are seal welded to the adjoining horizontal flanges 49 of casing panels 48 above and below the buckstay, each section 61 being preferably arranged relative to a given buckstay as seen in Fig. 7, with horizontal top and bottom walls 64 substantially in contact with the outer buckstay flange 24. Each breather plate 61 is desirably formed in lengths corresponding to the widths of the panels which it connects, with each length having end flanges 63 (Fig. 1) for similar welding to adjoining breather plate lengths, or to a corner casing or housing 65 Figure 9 about to be described, the transverse joints formed by each pair of connected end flanges 63 thereby being in vertical planar alignment with the corresponding joints between successive panels in each horizontal row.

At a corner of chamber 14 where two adjoining walls 12 are connected as illustrated in Fig. 5, the buckstays 21 associated with the respective walls are enclosed by a corner casing or housing 65 suitably of the construction detailed in Figs. 9 to 16 inclusive, and an expansible connection thereby provided between the breather plates 61 of adjoining walls and also between the end panels 48a of such walls. The buckstay housing assembly 65 (Figs. 9, 10) includes a corner cap 67 (Fig. 13), of channel-like cross-section, having outer side wall portions 68 arranged at right angles to each other and terminating in vertical edges 69, an intermediate side wall portion 71 providing a chamfered outer corner formation therebetween. The top and bottom plates 72 each terminate in edges 73 at right angles to each other to define, with edges 69, the open end portions of cap member 67, each plate 72 having its inner corner cut away as shown to provide edges 74 defining a right angled notch therebetween.

A batten 75 (Fig. 14) comprising a U-shaped bar 76 is assembled inwardly of corner cap 67 at each end, as indicated in Fig. 9, with filler strips 78 integral therewith at its outer side to provide a space 79 Figure 11 for slidably receiving a U-shaped sleeve member 81 (Fig. 15) between batten bar 76 and the top, bottom and side walls 72, 72 and 68 of corner cap 67. Each sleeve member 81 is formed with slots 82 extending inwardly from edges 83 at one end and the member firmly clamped by cap screws 84 Figure 11 between batten bar 76 and the top, bottom and side walls of casing member 67, as indicated in Figs. 9–11, the screws 84 being tapped into holes 77 in batten bar 76 and extending through holes 85 in casing member 67 and through the slots 82 in sleeve member 81. Each sleeve member 81 is provided with end flanges 86 connected and sealed by welds 54 Figure 9 to adjoining end flanges 63 of breather plate 61.

The flanges 86 along the top and bottom sides of sleeve 81 each terminate short of an inner edge 87 to provide space along the sleeve for attachment of leg 89 Figures 11, 12 of a vertical bent plate 91 by weld 92, the leg 89 being sealed to the adjoining vertical flange 49a of end panel 48a by weld 54, as described for other similar joints throughout the casing. The other leg 93 shown in Figure 11 of each bent plate 91 is formed with a slot 94 extending inwardly from its edge for insertion of a cap screw 95 therethrough by which the legs 93 are firmly clamped between vertical inner and outer angle bars 96 and 97, respectively, to form a vertical corner seal, as seen in Fig. 12, the cap screws 95 being screwed into the legs of inner angle bar 96. As will be understood, the bent plates 91 and angle bars 96 and 97 extend throughout the height of the casing between upper and lower buckstay units 17A and 17B.

Figure 14:
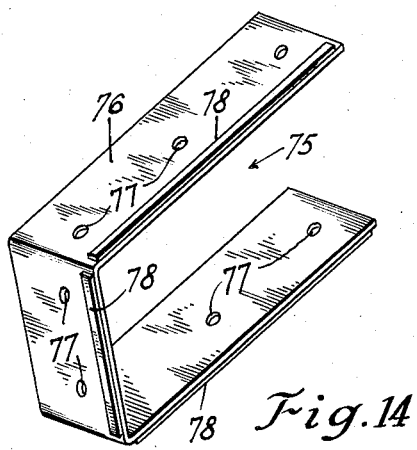
Figure 13:
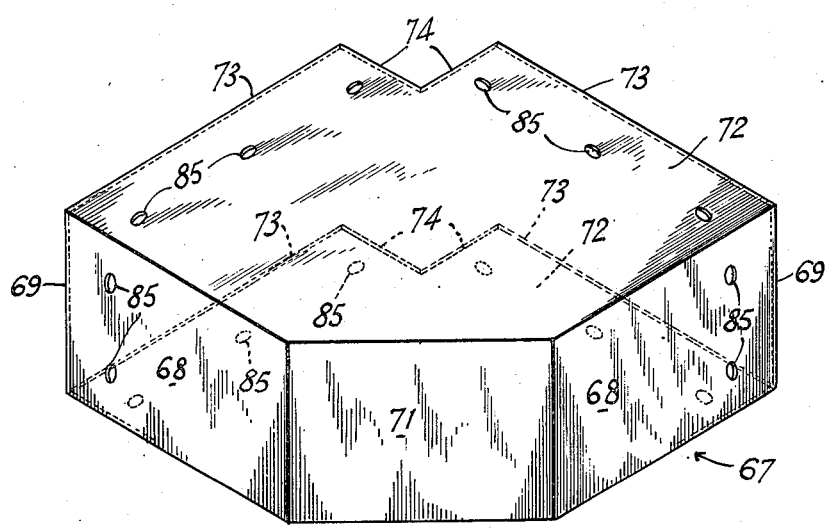
Figure 16:
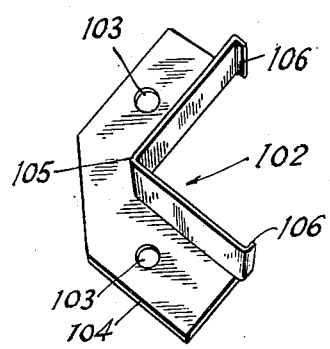

Flanged corner plates 102 are fastened to the upper and lower walls of corner cap 67, being held in position adjacent the margin of notch 74 Figure 13 by two of the cap screws 84 Figure 9 which hold the battens 75 Figure 14 in place, the screws passing through holes 103 in a base plate portion 104. Each corner plate 102 Figure 16 is formed with a vertical right angle flange 105 Figure 16 which overlaps the adjacent end of outer angle bar 97 Figure 12 and terminates in horizontally bent end portions 106 engaging lateral edges of the bar 97, as seen in Fig. 9.

In a wall of the character disclosed, an important feature is the simplicity of construction both with respect to the lateral support of the wall and the combined vertical and lateral support of its casing, the number of components being relatively small and a relatively small number of fabricating operations being required. Lateral support of the wall is effected in a manner requiring a minimum number of bolted connections whereby machining operations are reduced and erection greatly facilitated, the buckstay supporting brackets 26 being of a form enabling them to be assembled along the buckstay from one end and the resulting assembly then lifted into position where the brackets are field welded to wall tubes. All bracket connections, including those at the corners, provide for ample differential movement between the tube wall and buckstays due to expansion and contraction during operation.

In the form of casing disclosed, the major components are formed from commercially available flat plates or sheets and require a minimum of fabrication to prepare them for assembly, all such plate members including the main panel members being of relatively thin gauge whereby the overall cost of production is appreciably lessened. A minimum member of panels are utilized by making individual panels relatively wide and in single lengths between upper and lower buckstays, thereby reducing the number of joints involved and correspondingly decreasing the cost of manufacture and installation. Relatively large panel areas may be used and still maintain the stiffness of casing required to resist furnace draft or pressures. This results from the welding of each panel throughout its perimeter to adjoining panels and, where especially large panels are employed, by welding a stiffener member thereto intermediate opposite panel edges. The welding of one panel flange directly to another requires only single bead welding at each joint whereas with a stiffener means inserted between flanges, as heretofore employed, two beads of welding are required for sealing each joint between panels. The support of the casing is simplified and provision for expansion facilitated, both horizontally and vertically, by the employment of clip elements slidably engaging upper and lower buckstays. A further important feature is the provision of a flexible breather connection between vertically spaced casing sections whereby one section may move relative to the other without disrupting the seal therebetween. Horizontal expansion and contraction of the casing is compensated for adjacent at least one of its lateral edges where a gas tight seal is also maintained.

While in accordance with the provisions of the statutes we have illustrated and described herein the best form of our invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. In a combination comprising two upright walls defining a corner therebetween and each having a row of upright tubes therein, a tie-bar in each of said walls rigidly connecting successive tubes thereof and terminating adjacent said corner, a buckstay in each of said walls spaced from and vertically supported on said row of tubes, a corner bracket connecting said tie-bars and buckstay members comprising a pair of similar bracket sections each section terminating in an upright flange portion and each section having horizontal plate portions connected respectively to the tie-bar and buckstay of one of said walls, said horizontal plate portions of the respective bracket sections including portions having slidable connections with said buckstay members for relative movement of respective tie-bars longitudinally of the corresponding buckstay members, and means separably connecting said sections comprising members engaging said upright flange portions.

2. In a wall comprising upper and lower horizontally extending beam members having vertically arranged upper and lower flange portions, an upright wall casing section extending between said members, and means for supporting the weight of said section while maintaining said section in predetermined upright position, said means comprising clip members of channel like cross-section arranged along the upper and lower margins of said casing section, each of said clip members having slots in the flanges thereof engaging a flange portion of the adjacent beam member.

3. In combination, a sectional casing exposed to differential pressures at opposite sides, said casing comprising separate substantially rectangular panels arranged upright in a horizontal row and each panel formed of a relatively thin flat metallic sheet having a marginal flange extending outwardly therefrom substantially throughout its perimeter, a pair of vertically spaced buckstay members arranged horizontally above and below said row of panels, one of said members having an upright flange in a common plane with and opposing a corresponding flange on the other of said members, means connected to said panel flanges along the upper and lower margins of said sheets and engaging said buckstay flanges for supporting the weight of said panels on said lower buckstay member while maintaining said panels in predetermined upright position, said means projecting beyond said margins and slidably engaging said buckstay flanges to permit differential horizontal movement between said panels and buckstays longitudinally of said row, means sealing the joints between successive panels comprising a single bead of weld metal directly connecting the outer edges of each two adjoining flanges along upright margins of said sheets, and a stiffener member secured to each sheet intermediate opposite upright margins thereof.

4. In a wall including a row of upright fluid heating tubes vertically supported at one elevation and expansible in length toward other elevations, means laterally supporting said tubes comprising a horizontally disposed buckstay member vertically supported on said tubes at an elevation displaced from said elevation of vertical support, an upper and a lower upright casing section laterally spaced from said tubes and having adjacent ends disposed respectively above and below said buckstay member, means for vertically supporting one of said casing sections on said buckstay member and the other of said sections on the end remote from said buckstay member, and a flexible housing connecting said adjacent casing section ends and forming an enclosure for said buckstay member.

5. In a combination comprising two upright walls meeting at a corner, a row of upright tubes in each of said walls, horizontally extending buckstay members disposed outwardly of the corresponding rows and vertically supported on tubes of the corresponding rows, said buckstays respectively terminating in ends adjacent said corner, casing sections enclosing the buckstay members in the respective walls, and a flexible corner casing section enclosing said buckstay member ends and having gas tight expansible connections with said casing sections in said upright walls.

6. In a wall comprising a row of upright tubes, a horizontally extending buckstay member disposed outwardly of said row and having an upper flange portion substantially paralleling said row, means vertically supporting said member on said tubes arranged to permit horizontal differential movement between said member and said row, an upright casing section arranged parallel to said row above said buckstay member, and casing support means formed with depending portions extending downwardly from the lower margin of said section in transverse relation to said upper flange portion, each of said depending portions having a slot therein which seat on said upper flange portion, said slot providing sufficient clearances adjacent the sides of said flange portion to permit horizontal differential movement between said buckstay member and said casing section.

References Cited in the file of this patent

UNITED STATES PATENTS

| Number | Name | Date |
|---|---|---|
| 1,856,036 | Bennett | Apr. 26, 1932 |
| 1,880,187 | Drake | Sept. 27, 1932 |
| 1,912,913 | Nygaard | June 6, 1933 |
| 1,921,346 | Conroy | Aug. 8, 1933 |
| 1,922,599 | Murray | Aug. 15, 1933 |
| 2,074,874 | Vogel | Mar. 23, 1937 |
| 2,120,129 | Hardgrove et al. | June 7, 1938 |
| 2,144,598 | Brinckerhoff et al. | Jan. 17, 1939 |
| 2,228,953 | Hackett | Jan. 14, 1941 |
| 2,255,803 | Offutt | Sept. 16, 1941 |
| 2,267,839 | Rehm | Dec. 30, 1941 |
| 2,292,354 | Artsay | Aug. 11, 1942 |
| 2,302,563 | Masters | Nov. 17, 1942 |
| 2,305,611 | Frisch | Dec. 22, 1942 |
| 2,333,777 | Godshalk | Nov. 9, 1943 |
| 2,355,800 | Hensel | Aug. 15, 1944 |
| 2,432,354 | Temple | Dec. 9, 1947 |